United States Patent

[11] 3,621,283

[72] Inventors Kees Teer;
Frederik Leonard Johan Sangster, both of Emmasingel, Eindhoven, Netherlands
[21] Appl. No. 816,954
[22] Filed Apr. 17, 1969
[45] Patented Nov. 16, 1971
[73] Assignee U. S. Philips Corporation New York, N.Y.
[32] Priority Apr. 23, 1968
[33] Netherlands
[31] 6805706

[54] DEVICE FOR CONVERTING A PHYSICAL PATTERN INTO AN ELECTRIC SIGNAL AS A FUNCTION OF TIME UTILIZING AN ANALOG SHIFT REGISTER
4 Claims, 5 Drawing Figs.

[52] U.S. Cl. .......... 307/229, 178/7.1, 307/221, 307/304, 307/311, 328/37, 328/55, 317/235 N, 317/235 G
[51] Int. Cl. .......... G06g 7/12
[50] Field of Search .......... 307/311, 221, 304, 229; 317/235 N, 235 G; 178/7.1; 313/108 R; 315/169 R, 169 TU; 328/37, 55

[56] References Cited
UNITED STATES PATENTS

| | | | |
|---|---|---|---|
| 3,172,043 | 3/1965 | Altman | 328/55 |
| 3,390,273 | 6/1968 | Weckler | 317/235 N |
| 3,446,973 | 5/1969 | Springer, Jr. | 307/311 |
| 3,471,711 | 10/1969 | Poschenrieder et al. | 328/37 |
| 3,546,490 | 12/1970 | Sangster | 328/055 |

OTHER REFERENCES

Electronics May 1, 1967 " Charge Storage Lights The Way For Solid State" Display pp. 65- 68.
" Charge Storage Lights The Way For Solid State Image Sensors" Electronics May 1, 1967 Weckler.

*Primary Examiner*—Robert L. Griffin
*Assistant Examiner*—Donald E. Stout
*Attorney*—Frank R. Trifari

ABSTRACT: A device for converting energy patterns in the form of pressure, heat or magnetic images into an electrical signal as a function of time where the necessity for a scanning beam or a crossed bar readout system is eliminated by cascading elements which function as both storage and energy sensitive devices and by providing circuitry for shifting the charges of the energy sensitive storage elements in a single direction along the cascaded array.

Figure 1:
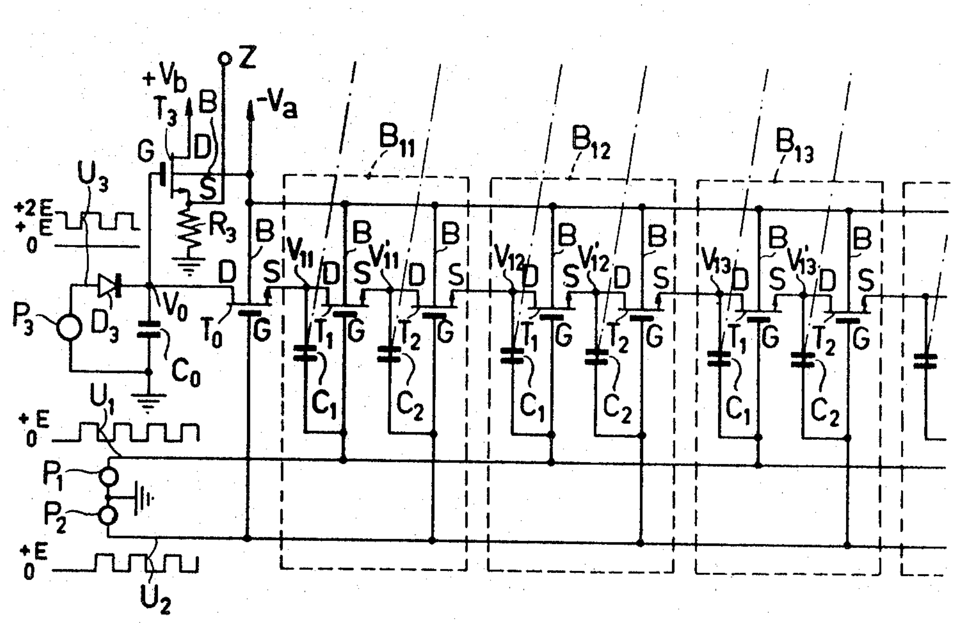

INVENTORS
KEES TEER
FREDERIK L.J. SANGSTER
BY
AGENT

INVENTORS
KEES TEER
FREDERIK L.J.SANGSTER
BY
Frank R. Jinfari
AGENT

INVENTORS
KEES TEER
FREDERIK L. J. SANGSTER
BY
Frank R. Trifari
AGENT

INVENTORS
KEES TEER
FREDERIK L. J. SANGSTER
BY
Frank R. Trifari
AGENT

DEVICE FOR CONVERTING A PHYSICAL PATTERN INTO AN ELECTRIC SIGNAL AS A FUNCTION OF TIME UTILIZING AN ANALOG SHIFT REGISTER

The invention relates to a device for converting energy pattern into an electric signal as a function of time, which device comprises at least one row of pickup elements. In the pickup elements, which comprise a semiconductor circuit element, the information of the energy pattern is converted into an electric voltage corresponding thereto in value across a capacitance in a pickup element.

Such a device, for example, for observing a scene optically or in the infrared range is known from the article "Charge Storage Lights the Way for Solid-State Image Sensors" by G. P. Weckler in "Electronics," May 1, 1967, pp. 75–78.

In the said article pickup elements are described inter alia which contain semiconductor metal oxide (MOS) transistors. A PN-junction of the MOS transistors of the P-channel type brought in the cutoff condition serves as a capacitance. The radiation from the scene to be observed is incident on said capacitance. Dependent upon the intensity of the radiation more or fewer holes and electrons will be created in the boundary layer between the semiconductor P- and N-layers which discharge the capacitance by recombination with the charge provided on the capacitance. By subsequently charging the capacitance again by means of a pulsatory voltage and determining the charge required for that purpose, an indication regarding the intensity of the incident radiation is obtained for a pickup element in the form of an electric signal.

Pickup elements forming a pickup array are also described in the article, in which the capacitances collecting the radiation are constituted by phototransistors, the pulsatory charging voltage being applied through MOS transistors serving as switches. It is proposed to use a system of crossed bars to obtain the electric signal representing the physical information from the pickup elements. The pickup elements are provided between the intersections of two pairs of intersecting parallel conductors. The pickup elements are thus connected in rows and columns by means of the conductors. By applying a switching signal to one of the row conductors and one of the column conductors, the electric signal representing the radiation is obtained, through the MOS transistor operating as a switch, from the pickup element arranged between the relative conductors.

The reading out of the said pickup array by means of a system of crossed bars, presents many problems and disadvantages. The intersecting conductors of the system of crossed bars are located close to each other. Therefore, comparatively large stray capacitances are present between the conductors. Since for reading out the pickup elements a high-frequency switching signal is required said stray capacitances give a disturbing crosstalk effect.

Since the requirement holds that only one pickup element of a row or of a column should provide its information, the result is that between the relative pickup element and the conductor, a small resistance must be present and between the other pickup elements and the conductor a large resistance must be present. For that purpose it is stated in the above-mentioned article that in each phototransistor operating as a capacitance, a MOS transistor must be provided which serves as a switch. It also holds that a conductor must be very low-ohmic in order that the switching signal be attenuated by the conductor as little as possible. The attenuation and, for example, the voltage drop across the conductor resulting therefrom, may in fact have for its result that a pickup element other than the relative pickup element also provides information. The requirement of the readily conducting material for the conductor for which, for example, aluminum is suitable, presents difficulties in integration methods for the pickup elements constructed with semiconductor material as regards the provision and the required connections.

In addition at least two shift registers are required for supplying the switching signal to the rows and to the columns.

It is the object of the invention to provide a device which does not exhibit the above-mentioned drawbacks associated with a system of crossed bars, in which also the influence of stray capacitances occurring is used to advantage. The device according to the invention provides an entirely new method of reading out the pickup elements and for that purpose it is characterized in that the capacitance in a pickup element is present between an output electrode and a control electrode of the said semiconductor circuit element. The control electrode is connected, through a voltage source which can produce a voltage having a value as a function of time cutting off the semiconductor circuit element, to a control electrode of another semiconductor circuit element between the output electrode and control electrode of which another capacitance is present. The output electrode of one semiconductor circuit element is coupled to the input electrode of the other semiconductor circuit element, A transport of charge which depends upon the information of the radiation pattern occurring in said coupling between one capacitance and the other capacitance as a result of bringing the other semiconductor circuit element in the conductive condition by means of the said voltage source.

In order that the invention may be readily carried into effect, a few examples thereof will now be described in greater detail with reference to the accompanying drawings.

FIG. 1 shows a device according to the invention in which the pickup elements are provided with semiconductor circuit elements constructed as MOS transistors.

Figure 2:
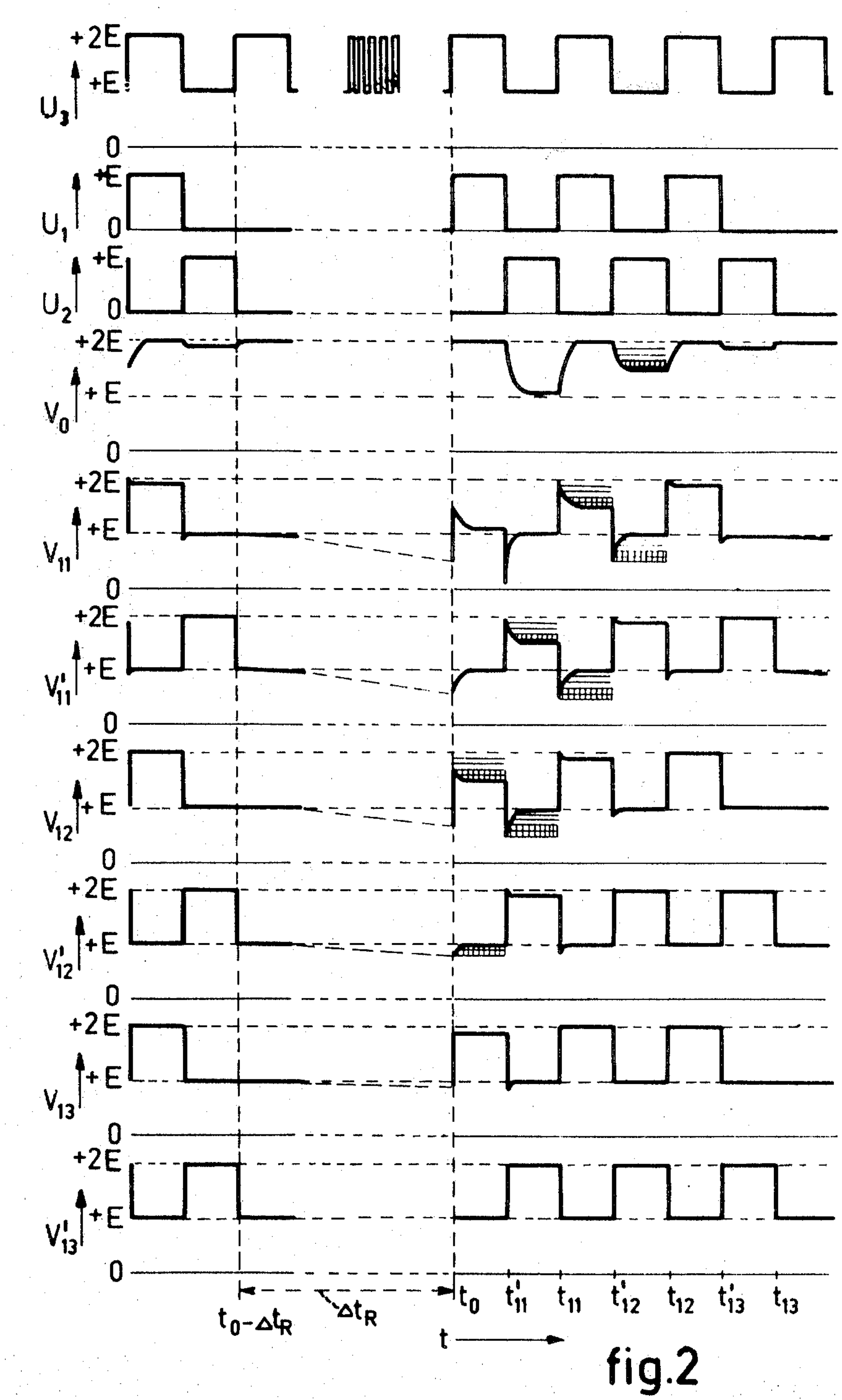

FIG. 2 serves to explain the operation of the device shown in FIG. 1 and shows diagrammatically a few diagrams as a function of time.

Figure 3:
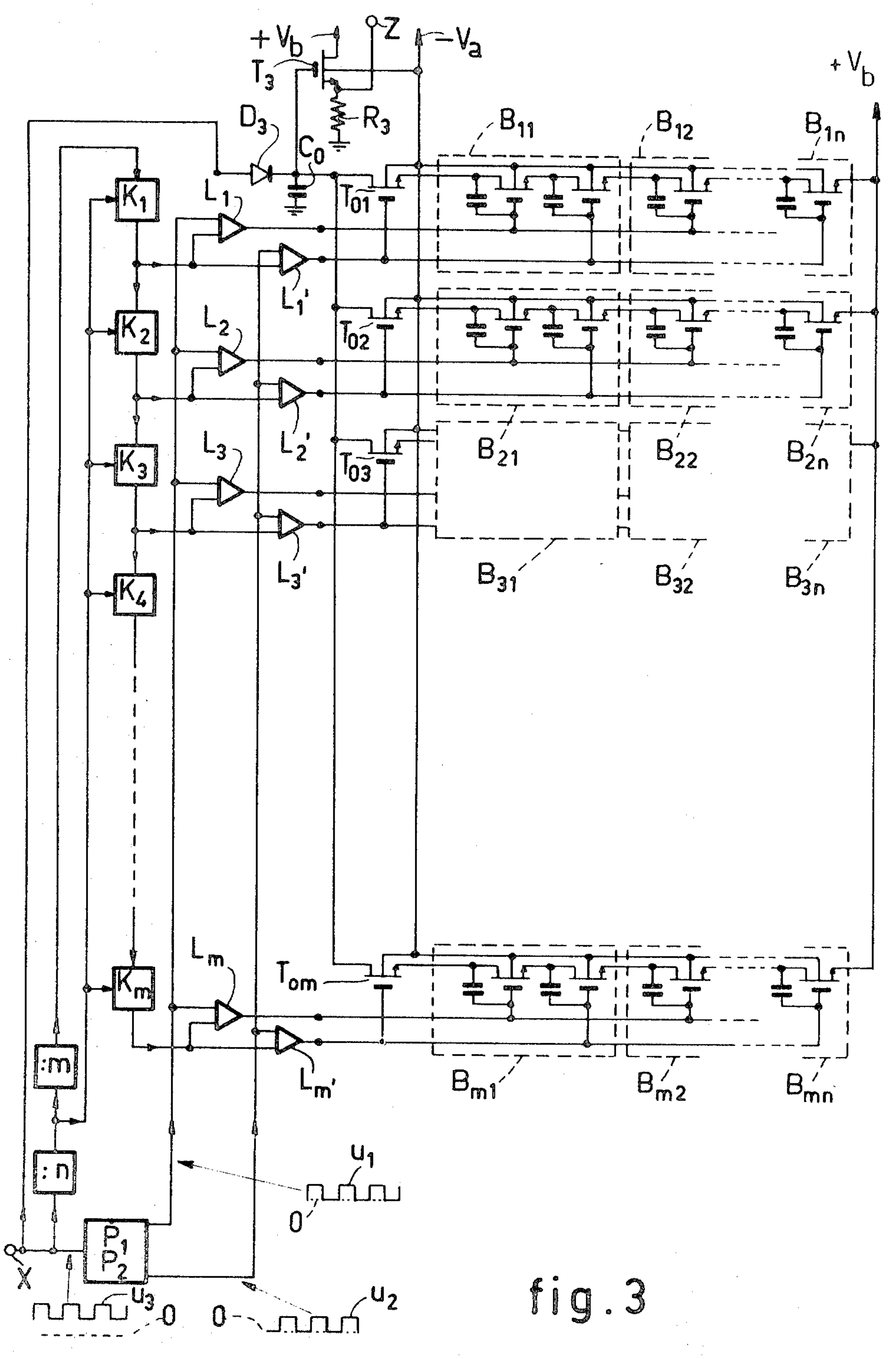

FIG. 3 shows a device according to the invention provided with several rows of pickup elements.

Figure 4A:
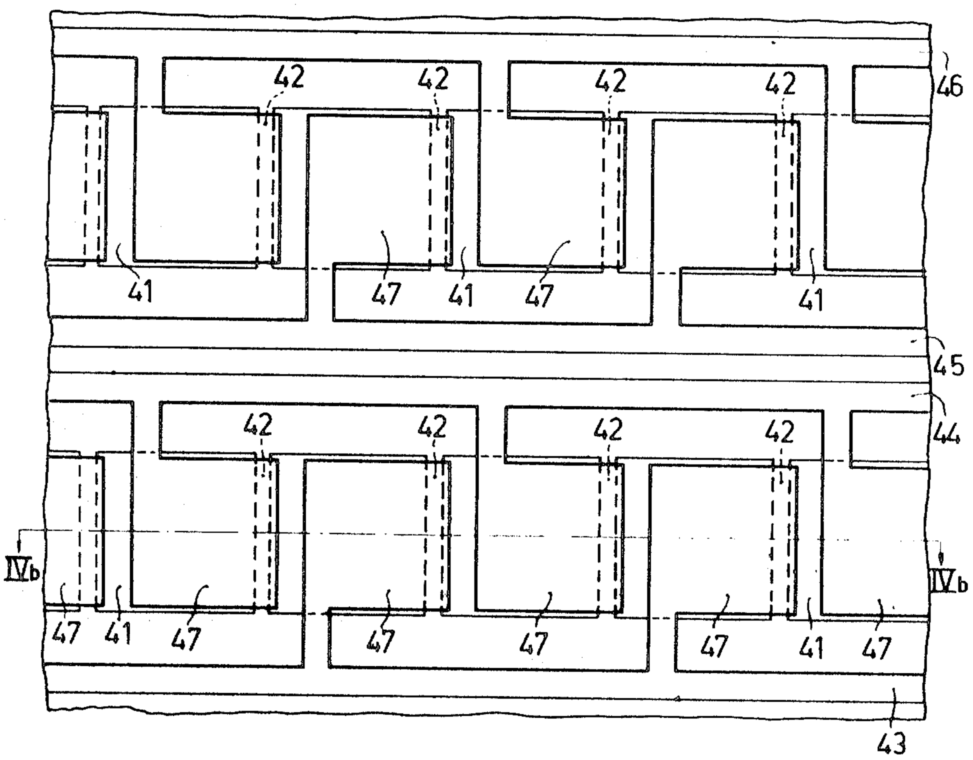
Figure 4B:
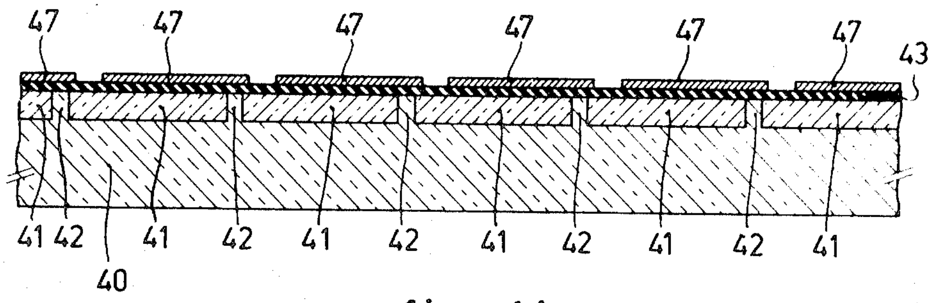

FIGS. 4*a* and 4*b* show an example of an embodiment of the pickup elements in IC-form of a device according to the invention.

Referring now to FIG. 1, of a device according to the invention constructed with a number of pickup elements 1 to n which are collectively denoted by pickup elements $B_{11}$ to $B_{1n}$, the first three pickup elements $B_{11}$, $B_{12}$ and $B_{13}$ are shown in detail. Since the pickup elements $B_{11}$ to $B_{1n}$ are constructed in the same manner a detailed description is given of the pickup element $B_{11}$ only. The pickup element $B_{11}$ comprises two semicondcutor circuit elements, denoted as transistors $T_1$ and $T_2$ which are further constructed as semiconductive metal oxide (MOS) transistors of the N-channel type. An input or source electrode denoted by S and an arrow indicating the direction of current of MOS transistor $T_1$ is connected to an output or drain electrode of MOS transistor $T_2$ denoted by D, while of MOS transistors $T_1$ and $T_2$ a mass or bias electrode B arranged on the substrate of each transistor is connected to a terminal having a negative potential $-V_a$. The terminal which is at the potential $-V_a$ forms part, in a manner not shown, of a direct voltage source $V_a$ another terminal of which is connected to ground. The same will apply to further direct voltage sources to be mentioned in the description. A control or gate electrode G of MOS transistors $T_1$ and $T_2$, respectively, is coupled to the drain electrode D through a capacitance denoted as capacitors $C_1$ and $C_2$ respectively.

The pickup elements $B_{11}$ to $B_{1n}$ are connected together by connecting of each pickup element, except for the last pickup element $B_{1n}$, the source electrode S of MOS transistor $T_2$ to the drain electrode D of the MOS transistor $T_1$ in the succeeding pickup element and by interconnecting the gate electrodes G of the MOS transistors $T_1$ and $T_2$, respectively. The source electrode S of the MOS transistor $T_2$ in the pickup element $B_{1n}$ (not shown) may be connected both to a terminal having positive potential and may not be connected further, that is to say, it may be kept floating. The drain electrode D of the MOS transistor $T_1$ in the pickup element $B_{11}$ is connected to the source electrode S of a MOS transistor $T_0$ the bias electrode B of which is connected to the terminal having a negative potential $-V_a$ and the gate electrode G is connected to that of MOS transistors $T_2$. In the pickup elements $B_{11}$, $B_{12}$ and $B_{13}$, the potentials at the drain electrodes D of the MOS transistors $T_1$ and $T_2$, respectively, are denoted by $V_{11}$, $V_{12}$ and $V_{13}$ and $V_{11}'$, $V_{12}'$ and $V_{13}'$ respectively.

The interconnected gate electrodes G of MOS transistors $T_1$, MOS transistors $T_2$ and MOS transistors $T_0$, respectively, are connected to ground, through voltage sources $P_1$ and $P_2$, respectively. Voltage sources $P_1$ and $P_2$ produce the voltages $U_1$ and $U_2$ as a function of time shown in FIG. 1, which voltages vary between the ground potential denoted by zero and a potential value +E. The voltage $U_2$ produced by the voltage source $P_2$ lags half a period with respect to voltage $U_1$ which is supplied by the voltage source $P_1$. The drain electrode D of MOS transistor $T_0$ is connected to ground through a capacitor $C_0$. Parallel to the capacitor $C_0$ is connected a voltage source $P_3$ which supplies a voltage $U_3$ as shown through a diode $D_3$ connected with its cathode to capacitor $C_0$. The voltage $U_3$ having a square-wave form as a function of time varies between the potential value +E and a reference value +2E. The terminal of the capacitor $C_0$ having a potential $V_0$ is connected to the gate electrode G of a MOS transistor $T_3$ of the N-channel type, the bias electrode B and the drain electrode D, respectively, being connected to a terminal having a potential $-V_a$ and $+V_b$, respectively. The source electrode S of MOS transistor $T_3$ is connected to ground through a resistor $R_3$ and the voltage produced across the resistor $R_3$ dependent upon the value of potential $V_0$ appears at an output terminal Z of the device.

Instead of MOS transistors, germanium transistors or silicon transistors may alternatively be used in the device. The said input or source electrode S and output or drain electrode D correspond to an emitter and collector electrode respectively. The said gate electrode 6 corresponds to a base electrode, which two electrodes may collectively be referred to as control electrodes.

As is known, the construction of the said transistors $T_{0x}$, $T_1$, $T_2$ and $T_3$ as MOS transistors, as compared with normal germanium or silicon transistors for the same drive, presents the advantage of a very much smaller value of the current through the gate electrode G than through the base electrodes of the normal transistors. Of course, normal transistors in the known Darlington arrangement could also be used to obtain the same effect, or the loss of charge corresponding to the said base current could be eliminated by providing charge amplifiers between a few pickup elements. Alternatively, transistors using a field-effect (so-called FET's) are to be considered.

In the embodiment shown the physical pattern which is to be converted into an electric signal influences the voltage across the capacitors C1 and C2 and hence the values of the potentials $V_{11}$, $V_{11}'$, $V_{12}$, $V_{12}'$ and so on, by a physical interaction which is denoted diagrammatically by arrows in dot-and-dash lines. As already stated in the above-mentioned article, the interaction may be photoelectric. The capacitors $C_1$ and $C_2$ denote the capacitance of the PN-junction of the substrate-drain diode in the MOS transistors $T_1$ and $T_2$ present between the gate electrodes G and the drain electrodes D. In the capacitors $C_1$ and $C_2$ shown the stray capacitances are included in the MOS transistors $T_1$ and $T_2$ and these are thus used to advantage.

It is also possible to construct capacitors $C_1$ and $C_2$ as separate components having a leak resistance, the value of which depends upon the number of incident photons, for example, the dielectric of a parallel arranged photoresistor. Alternatively a pattern characterized by a pressure distribution or a geometry of unevennesses could act upon the dielectric constructed with piezo oxides, or on, for example, pressure sensitive resistors connected parallel to the capacitors $C_1$ and $C_2$. The same applies to a magnetization pattern, the magnetic field distribution of which influences the value of a resistor which is sensitive to magnetic fields. For that purpose the resistor may consist, for example, of an InSb-mass, in which NiSb-needles occur. The magnetic field influences the position of the NiSb-needles readily conducting electric current in the InSb-mass poorly conducting electric current.

The operation of the device according to the invention shown in FIG. 1 will now be explained with reference to the diagrams shown in FIG. 2. The diagrams shown in FIG. 2 as a function of time give the voltages $U_3$, $U_1$ and $U_2$ supplied by voltage sources $P_3$, $P_1$ and $P_2$ and the potentials $V_0$, $V_{11}$, $V_{11}'$, $V_{12}$, $V_{12}'$, $V_{13}$ and $V_{13}'$ which occur at the places already shown in FIG. 1. To explain the operation of the device shown in FIG. 1 it is sufficient to consider a device having only three pickup elements $B_{11}$, $B_{12}$ and $B_{13}$. It is assumed that the source electrode S of MOS transistor $T_2$ in the pickup element $B_{13}$ is kept floating. To obtain a closely reasoned explanation of the cyclic operation of the device a given condition is started from. It will appear that after the period to be explained, the assumed given condition is again reached automatically. The period of the square wave voltage $U_3$ is shown in FIG. 2 with a few time intervals $t_0$ to $t_{11}$, $t_{11}$ to $t_{12}$, $t_{12}$ to $t_{13}$.

In FIG. 2 an instant $t_0 - \Delta t_R$ is shown shortly after which the potentials shown $V_{11}$, $V_{11}'$, $V_{12}$ $V_{12}'$, $V_{13}$ and $V_{13}'$ all appear to have the value +E, while the potential $V_0$ is equal to +2E. Starting from the instant $t_0 - \Delta t_R$ in which a time interval denoted by $\Delta t_R$ for television will be found to lie in the order of a few tens of milliseconds, the following occurs in the time interval $\Delta t_R$: the value of the voltages $U_1$ and $U_2$ supplied during the time interval $\Delta t_R$ to the gate electrodes G of MOS transistors $T_0$, $T_1$ and $T_2$ by voltage sources $P_1$ and $P_2$ is equal to ground potential, so that said transistors are cutoff during the time interval $\Delta t_R$ due to the higher potential at the source electrodes. S. In the time interval $\Delta t_R$ the value of the voltage $U_3$ supplied by the voltage source $P_3$ varies between the potentials +2E and +E. Since the potential $V_0$ has the value +2E and keeps it during the time interval $\Delta t_R$ when leakage losses are negligible, the diode $D_3$ will not conduct. In order to show that, for example, for television, the time interval $\Delta t_R$ is relatively long with respect to the recurrence period of the voltage $U_3$, the voltage $U_3$ during the time axis denoted by a broken line, shortened relative to that which is shown by a solid line, is shown again with an apparently more rapidly varying square-wave voltage. During the comparatively long time interval $\Delta t_R$ the energy pattern to be converted influences the voltage across the capacitors $C_1$ and $C_2$ and causes it to decrease dependent upon the value of the information. Assuming the information in the form of photons to represent a scene to be picked up, the light from the scene varying in brightness from white peak via gray to black, it may be assumed that, for example, the bright white light impinges upon capacitor $C_1$ of pickup element $B_{11}$ and no light impinges upon the capacitor $C_2$ of the pickup element $B_{13}$ while the intermediate values are evenly distributed between the other capacitors $C_1$ and $C_2$. The result is that during the time interval $\Delta t_R$ the potentials $V_{11}$, $V_{11}'$, $V_{12}$, $V_{12}'$ and $V_{13}$ decrease, while the potential $V_{13}$, for negligible dark current remains constant. The potential drop during the time interval $\Delta t_R$ is shown linearly in FIG. 2, which, however, is not required. A nonlinear, for example, exponential drop is also readily possible. As will become apparent in the course of the description, the minimum occurring potential value for the maximum value of the brightness of the light should not be smaller than +½E. This value is reached for white peak, by the potential $V_{11}$ at the end of the time interval $\Delta t_R$, that is to say at the instant $t_0$. It is found that the potentials $V_{11}$ to $V_{13}'$ at the end of the time interval $\Delta t_R$ have values, which dependent upon the brightness of the light, vary from +½E for white peak to +E for black.

At the instant $t_0$ the value of the voltage $U_1$ supplied by the voltage source $P_1$ steps from ground potential 0 to +E. The result is that this potential step is impressed upon the gate electrodes G of the MOS transistors $T_1$ and the terminals of capacitors $C_1$ connected thereto. As a result of this the potential step having the value E will simultaneously occur, through the capacitors $C_1$, in the potentials $V_{11}$, $V_{12}$ and $V_{13}$, so that these reach values at the instant $t_0$ which lie between +1½E and approximately +3E. The potential step from 0 to +E on the gate electrode G of MOS transistor $T_1$ sets it in the conductive condition if the potential at the source electrode S is lower than +E. As a result of this the capacitors $C_1$ and $C_2$ in the pickup elements $B_{11}$ and $B_{12}$ are connected together until, apart from threshold voltages, the value of the potential at the source electrode S has become equal to that at the gate electrode G of the MOS transistor $T_1$. The charge required therefor cannot be applied through the gate electrode G but must be supplied from the capacitor $C_1$ through the drain electrode D and the source electrode S to the capacitor $C_2$. Starting from substantially the same values of the capacitors $C_1$ and $C_2$ it is found that, as shown in FIG. 2 in the time interval $t_o$ to $t_{11}'$, the respective potentials $V_{11}$ and $V_{12}$ will have to decrease as much as the respective potentials $V_{11}'$ and $V_{12}'$ will increase.

Since no light has impinged upon the capacitor $C_2$ in pickup elements $B_{13}$, the change of the capacitor $C_2$ has remained constant. The potential step from 0 to +E at the gate electrode G of MOS transistor $T_1$ in pickup element $B_{13}$, will therefore not cause the same to become conductive.

The result of the potential step in the voltage $U_1$ at the instant $t_o$ is that in a pickup element the loss of charge in the capacitors $C_2$, due to the charging to the potential +E, has been transferred to the capacitor $C_1$ through the source electrode S and the drain electrode D of the conductive MOS transistor $T_1$. The potentials $V_{11}$, $V_{12}$ and $V_{13}$ thus obtain a given value relative to the value +2E which difference value corresponds to the brightness of the light which is incident on the pickup elements $B_{11}$, $B_{12}$ and $B_{13}$.

At the instant $t_{11}'$ the value of the voltages $U_1$ and $U_3$ respectively, supplied by the voltage sources $P_1$ and $P_3$ respectively, steps back from the value +E, and +2E, respectively, to ground potential and potential value +E, respectively. Simultaneously the voltage $U_2$ supplied by the voltage source $P_2$ steps from ground potential to the value +E. The potential step in the voltages $U_1$ and $U_2$, respectively, show a potential step E downwards and upwards, respectively. In the pickup elements $B_{11}$, $B_{12}$ and $B_{13}$, the so far cutoff MOS transistors $T_2$ will become conductive instead of the MOS transistors $T_1$, as it also holds for MOS transistor $T_o$. As a result of this, the terminal of capacitor $C_o$ which has a potential $V_o$ equal to +2E, is connected, through MOS transistor $T_o$ to the terminal of capacitor $C_1$ in pickup element $B_{11}$ which has a potential $V_{11}$. Since potential $V_{11}$ is lower than +E, which value is impressed upon the gate electrode G of MOS transistor $T_o$ by the voltage source $P_2$ with voltage $U_2$, the potential $V_{11}$ will increase the value +E. As already described above, the charge required for that purpose will have to be supplied by capacitor $C_o$. For a value of capacitor $C_o$ equal to that of capacitor $C_1$ in pickup elements $B_{11}$, the increase of potential $V_{11}$ will be equal to the drop of potential $V_o$.

The same phenomenon presents itself between the pickup elements $B_{11}$, $B_{12}$ and $B_{13}$, the loss of charge in the capacitors $C_1$ in the pickup elements $B_{12}$ and $B_{13}$, respectively, being transmitted to the capacitor $C_2$ in pickup elements $B_{11}$ and $B_{12}$. This is expressed in FIG. 2 when the potentials $V_o$, $V_{11}'$ and $V_{12}'$, respectively, are compared with the potentials $V_{11}$, $V_{12}$ and $V_{13}$, respectively, during the stated time interval $t_{11}'$ to $t_{11}$. During this time interval $t_{11}'$ to $t_{11}$, the diode $D_3$ remains cut off since the value of the voltage $U_3$ is equal to +E.

The potential $V_o$ decreased from +2E to approximately +E, causes, through the transistor $R_3$ a smaller current to flow through the MOS transistor $T_3$ so that relative to ground a voltage occurs at the output terminal Z of the device which is equal to potential $V_o$. The voltage drop occurring at the output terminal Z, thus represents the brightness of the light which impinges upon the pickup element $B_{11}$.

At the instant $t_{11}$ a potential step occurs in the voltages $U_1$, $U_2$ and $U_3$, after which these voltages obtain the same value as shortly after the instant $t_o$. The result is the same operation of the device as already described at the instant $t_o$. A difference is, however, that in the time interval $t_{11}$ to $t_{12}'$ the potential $V_0$ will increase to the value +2E, since this value is impressed by the voltage source $P_3$ through the conductive diode $D_3$.

For illustration FIG. 2 shows a part of the potential variations which correspond to the brightness of the light incident upon the pickup element $B_{12}$ as a shaded area. It can simply be seen that during the time interval $t_o$ to $t_{11}'$ the information given by the value of potential $V_{12}'$ relative to +E is transmitted to the potential $V_{12}$ and is superimposed thereon relative to the value +2E. During the time interval $t_{11}'$ to $t_{11}$, the total information which is supplied to the pickup element $B_{12}$ during the time interval $\Delta t_R$ is transferred to the capacitor $C_2$ in the pickup element $B_{11}$ as a result of which the potential $V_{11}'$ varies relative to the value +2E. During the period $t_{11}$ to $t_{12}'$ the information of the pickup element $B_{12}$ is transferred in the pickup element $B_{11}$ from the capacitor $C_2$ having a potential $V_{11}'$ to capacitor $C_1$ having a potential $V_{11}$. The result is that in the time interval $t_{12}'$ to $t_{12}$ the information given by the pickup element $B_{12}$ is transferred to the capacitor $C_o$ and hence to the output terminal Z. The information of the pickup element $B_{13}$ becomes available at the output terminal Z for further processing in the time interval $t_{13}'$ to $t_{13}$.

It has been found that for reading out a device comprising three pickup elements it is necessary and sufficient that the voltages $U_1$ and $U_2$ supplied by the voltage sources $P_1$ and $P_2$ show three square-wave pulses during the time interval $t_o$ to $t_{13}$. From this it appears that shortly after the instant $t_{13}$ the value of the potentials $V_{11}$, $V_{11}'$, $V_{12}$, $V_{12}'$ and $V_{13}$, $V_{13}'$ is equal to +E while that of potential $V_o$ is equal to +2E. As already described above it is found that after reading out the device, the condition is automatically reached from which was started for the explanation. The result is that the instant $t_{13}$ for a cyclic operation of the device corresponds to the instant $t_o - \Delta t_R$.

For a device comprising $n$-pickup elements $B_{11}$, $B_{12}$, $b_{13}$ to $B_{1n}$, in which a time interval $\Delta t_R$ in which the light of the scene to be picked up influences the potentials $V_{11}$, $V_{11}'$, $V_{12}$, $v_{12}'$, $V_{13}'$, $V_{13}$ to $V_{1n}$, $V_{1n}'$must be comparatively large relative to the time interval $t_o$ to $t_{1n}$. This requirement does not hold for a device in which the information of the physical pattern is written instantaneously without integration in time. An example thereof may be a device in which a pattern characterized by a pressure distribution in an instantaneous manner influences the potential picture of the dielectric constructed with a piezo oxide of capacitors $C_1$ and $C_2$.

It is obvious from the variation of the potentials $V_{11}$ and $V_{11}'$ that the potential drop under the influence of the light from the scene for white peak cannot be more than ½E. If in fact the light impinges upon both capacitors $C_1$ and $C_2$ in the pickup element $B_{11}$ with maximum brightness that is to say white peak, the potential $V_{11}$ will decrease from +1½E to +E in the time interval $t_o$ to $t_{11}'$. The result is that shortly before the instant $t_{11}'$, the potential $V_{11}$ at the drain electrode D, the potential $V_{11}'$ at the source electrode S, and the potential at the gate electrode G of MOS transistor $T_1$ in the pickup element $B_{11}$ all have the value +E. If, however, the potentials $V_{11}$ and $V_{11}'$ should experience a larger drop than ½E and reach, for example, the value +2/5 E, the potential $V_{11}$ will decrease from +1 2/5 E to +E in the time interval $t_o$ to $t_{11}'$. Due to this the potential $V_{11}'$ can only increase by 2/5 E to the value +4/5 E. Since for a correct operation of the device it is required that the potential $V_{11}'$ at the source electrode S increases to the reference value +E, the limit already set results.

The stated limit of ½E for the potential drop does not hold for the case in which in each pickup element the voltage across the capacitor $C_1$ or $C_2$ is not influenced by the physical information but is kept constant at the reference value +E, so that the reference value is always available in a pickup element. As a result of this the other capacitor in the pickup element may experience a voltage drop by the value E, so may be substantially be discharged without interfering with the correct operation of the device. This may be realized, for example, by screening the dielectric of a capacitor $C_1$ or $C_2$ in each pickup element from the physical information or making it insensitive thereto.

When the device is actuated the charging of the capacitors $C_1$ and $C_2$ in the pickup elements $B_{11}$, $B_{12}$, $B_{13}$ to $B_{1n}$ occurs in a simple manner by means of the voltage sources $P_1$, $P_2$ and $P_3$ already described with reference to FIG. 1. The square-wave voltage $U_3$ supplied by the voltage source $P_3$ charges the capacitor $C_0$ at the value +2E via diode $D_3$ so that the potential $V_0$ obtains the valve +2E. The voltage $U_2$ supplied by the voltage source $P_2$ then makes the MOS transistor $t_0$ conductive at the value +E so that in the manner already described the potentials $V_0$ and $V_{11}$ obtain the value +E. The voltage $U_1$ supplied by the voltage source $P_1$ then renders the MOS transistor $t_1$ conductive at the value +E, so that as a result of the charge distribution between two capacitors, the potentials $V_{11}$ and $V_{11}'$ obtain the value +½E. Simultaneously, the capacitor $C_0$ is charged again so that the potential $V_0$ again has the value +2E. In a following period it is achieved that the potentials $V_{12}$ and $V_{12}'$ reach the value ⅛E. After $n$ periods the potentials $V_{1n}$ and $V_{1n}'$ are equal to $2(1-2n)$E, which value then rapidly increases due to the further charging of the preceding capacitors $C_1$ and $C_2$ until after some time a voltage having substantially a value +E is available across all the capacitors $C_1$ and $C_2$ present in the pickup elements $B_{11}$, $B_{12}$, $B_{13}$ to $B_{1n}$. This instant corresponds to the instant $t_0-\Delta t_R$ in FIG. 2. Of course, the charging can be accelerated by increasing the frequency of the voltages $U_1$, $U_2$ and $U_3$.

For analyzing optical, magnetic, or other physically given phenomena which manifest themselves in a one-dimensional pattern it is possible, as shown in FIG. 1, to use a single row of pickup elements for converting the physical pattern into an electric signal as a function of time. If it should be desirable to convert the information in a two-dimensional manner, the device shown in FIG. 3 provides a solution.

FIG. 3 shows a device according to the invention which is provided with $m$ rows having $n$ pickup elements. Since a row of pickup elements $B_{11}$, $B_{12}$, $B_{13}$ to $B_{0z}$was already described with reference to FIG. 1, and since in FIG. 3 the rows are constructed in an equivalent manner, the components of the pickup elements are not shown in detail. Furthur components already shown in FIG. 1 are denoted by the same reference numerals in FIG. 3 at least substantially. The MOS transistor $T_0$ associated with the row in FIG. 1, which for reading a row of pickup elements connects the same to the capacitor $C_0$ is constructed $m$-fold in FIG. 3 and is denoted for the rows 1, 2, 3, . . . . $m$, by $T_{01}$, $T_{02}$ , $T_{03}$ . . . $T_{0m}$. Instead of the source electrode S of the MOS transistor $T_2$ in the last pickup element $B_{13}$, which in the explanation of FIG. 1 was assumed to be floating, the corresponding source electrodes S of the MOS transistors $T_2$ in the last pickup elements $B_{1n}$, $B_{2n}$, $B_{3n}$ to $B_{mn}$ in FIG. 3 are connected together and connected to a terminal having the potential $+V_b$. All this is not essential for the invention.

The device shown in FIG. 3, may serve, for example, as a television camera, in which the light from the scene to be picked up is incident on the pickup elements $B_{11}$ to $B_{mn}$. In order to obtain the image signal produced by the camera at the output terminal Z, the voltage $U_3$ is shown at an input terminal X of the camera which voltage is produced by a voltage source $P_3$, not shown. In order to obtain the voltages $U_1$ and $U_2$ a combined voltage source ($P_1$, $P_2$) is shown which may comprise, for example, a symmetrical bistable trigger circuit which is pulsed by the voltage $U_3$. The voltage $U_3$ is also applied to an $n$-divider (denoted by $n$). The output voltage of the $n$-divider is applied to an $m$-divider (denoted by $m$) and to each of the shift register stages $K_1$, $K_2$, $K_3$ to $K_m$ constituting a shift register. The voltage supplied by the $m$-divider is applied to the first shift register stage $K_1$. The outputs of the shift register stages $K_1$, $K_2$, $K_3$ to $K_m$ are connected to an input of gates ($L_1$, $L_1'$), ($L_2$, $L_2'$) ($L_3$, $L_3'$) to ($L_m$, $L_m'$), respectively, to a second input of which gates L the volume $U_1$ and to a second input of which gates L' the voltage $U_2$ is also applied. The output of gates L and L', respectively, supplies the voltages $U_1$ and $U_2$, respectively, to a row of the pickup elements dependent upon the voltage supplied by the associated shift register stage K.

The voltage supplied by the $m$-divider has a recurrence period which is equal to $m \cdot n$. periods of the voltages $U_1$, $U_2$ and $U_3$ and serves as a starting voltage for the first register stage $K_1$. This latter then supplies a voltage to the gates $L_1$ and $L_1'$ during $n$-periods as a result of which the voltages $U_1$ and $U_2$ are transferred to the pickup elements $B_{11}$ to $B_{1n}$. The image signal supplied by the first row of pickup elements $B_{11}$ to $B_{1n}$ appears at the output terminal Z during the $n$-periods. After the $n$-periods the voltage supplied by the shift register stage $K_1$ varies, so that the gates $L_1$ and $L_1'$ are closed and the shift register stage $K_2$ is pulsed so that as a result of the varied voltage supplied by the stage $K_2$, the gates $L_2$ and $L_2'$ open for the second number of $n$-periods. After the $m^{th}$ number of $n$-periods, the row of the pickup elements $B_{m1}$ to $B_{mn}$ has supplied its image signal to the output terminal Z.

In the description with reference to FIGS. 1 and 2 the time interval $\Delta t_R$ is shown which occurs between two successive reading out operations of a row of pickup elements $B_{11}$ to $B_{1n}$. For the device shown in FIG. 3, having $m$ rows of pickup elements, the time interval $\Delta t_R$ in a cyclic operation appears to be equal to $(m-1)$ times the reading out interval of a row of pickup elements. For a television system having 25 images per second built up to 625 lines, the time interval $\Delta t_R$ is approximately equal to 40 ms. minus 64µs.

It is obvious that in a simple manner the known interlacing with two frames can be reached by applying the voltage supplied by shift register stages K2 to the gates $L_3$ and $L_3'$, while the gates $L_2$ and $L_2'$ are connected to a shift register stage which opens the same after approximately ½$m \cdot n$. periods.

It is obvious that for deriving a video signal having the so-called line blanking from the image signal occurring at the output terminal Z, both a part of the information supplied by the rows of pickup elements may be left unused and the shift register may be adapted by incorporating in the stages K, for example, a delay which corresponds to the line blanking time or, for example, the frame blanking time.

The three-fold or two-fold construction of the device shown in FIG. 3 results in a camera suitable for color television by dividing the light coming from the scene in three or two basic colors.

A semiconductor device constructed as a pickup array in which the pickup elements are preferably integrated in one semiconductor body will now be described with reference to FIG. 4. FIG. 4*a* diagrammatically shows a part of a plan view of an embodiment of such a semiconductor device, while FIG. 4*b* diagrammatically shows a cross-sectional view taken on the line IV*b*—IV*b* in FIG. 4*a*.

The embodiment shown in FIG. 4 comprises a substrate 40 which may be, for example, of an insulating material, the substrate being provided with one or more surface regions of a semiconductor material or, as in the present example, consisting itself of a semiconductor material, for example, P-type silicon. In a manner commonly used in semiconductor technology, for example, by means of a conventional photoresist and diffusion method, surface regions 41 of the opposite conductivity type, for example, having proportions of 64µm. × 64µm., are provided in a surface region of the substrate 40. These surface regions 41 together with the intermediate regions 42 constitute the semiconductor regions of a number of MOS transistors. These MOS transistors are arranged in series, in which each of the regions 41 shown constitutes the output or drain electrode of a MOS transistor of a series and also the input or source electrode of the succeeding MOS transistor of that series. The intermediate regions 42, width, for example, approximately 6µm., constitute the channel regions between the source and drain electrode of each MOS transistor. The MOS transistors are furthermore provided with gate electrodes 47, proportions approximately 60µm. × 60µm., which are insulated from the semiconductor surface by an insulating layer 43, for example, by a layer of silicon oxide, thickness 0.1µm. The gate electrodes 47 are alternately connected to one of the conductive tracks 43 and 44 and 45 and 46, respectively. The thickness of the insulating layer below the conductive tracks 43 to 46 preferably is larger than below the gate electrodes 47 (for example, approximately 0.5µm.) to prevent undesired channel formation. Channel interruptors, for example, diffused channel interruptors, may alternatively be used.

The gate electrodes 47 and the metal tracks 43 to 46 consist, for example, of gold, and have a thickness of approximately 250 A. Such gold electrodes are transparent so that radiation incident on the surface can be absorbed in the semiconductor body and the photosensitivity of the PN-junctions between the surface regions 41 and the surrounding surface region of the substrate 40 may be used. In connection herewith the distance between the surface of the semiconductor body and the said PN-junctions preferably is approximately 1$\mu$m. In the operating condition, the said PN-junctions are biased in the forward direction. For that purpose the surrounding surface region is connected to a negative potential, in this case via a connection conductor which is connected to the substrate 40 and is not shown.

The pickup elements of the pickup array are each constituted by two succeeding transistors. The two capacitances between which a transport of charge may occur dependent upon the information of the physical pattern, are provided between the gate electrode and the drain electrode of the two MOS transistors of the pickup element. In the present example, said capacitances are constituted by the internal capacitance between the gate electrode and the drain electrode for each MOS transistor, said internal capacitance being increased in that the gate electrodes 47 extend for a considerable part of their surface above the surface regions 41. The said transport of charge can be controlled with control signals which can be applied to the gate electrode 47 of the MOS transistors through the conductive tracks 43 to 46.

What is claimed is:

1. A device for converting an energy pattern into an electrical signal as a function of time, comprising a plurality of serially connected pickup elements; each of said elements comprising an input terminal, an output terminal, at least two semiconductor switches each having input, output and control terminals, a capacitor connected in parallel with the control and input terminals of each of the semiconductor switches in each pickup element, an energy-sensitive conduction path means connected in parallel with each capacitor for discharging each capacitor at a rate determined by the amount of energy incident thereon, means for connecting the output terminal of a first of the semiconductor switches in each element to an input terminal of a second semiconductor switch in each element, means for connecting the input terminal of the first semiconductor switch in each element to the input terminal of that element, means for connecting the output terminal of the second semiconductor switch of each element to the output terminal of that element; the device further comprising an external semiconductor switch having input, output and control terminals; means for connecting the output terminal of the external semiconductor switch to the input terminal of a pickup element on an end of the plurality of serially connected pickup elements, an external capacitor connected to the input terminal of the external semiconductor switch, means for providing a first alternating switching voltage to the control terminal of each of the first semiconductor switches in each element, means for providing a second alternating switching voltage to the control terminal of the external semiconductor switch and to the control terminals of each second semiconductor switch in each element, and means for providing a third alternating voltage in phase with said second alternating switching voltage for charging said external capacitor.

2. A device as claimed in claim 1, wherein each of the semiconductor switches in each pickup unit comprises a metal oxide transistor, wherein each of the capacitors in the pickup units each comprise a PN-junction of an associated MOS transistor, and wherein the radiation sensitive conduction path means comprises a photosensitive boundary layer of the MOS transistor.

3. A device as claimed in claim 1, further comprising an additional row of serially connected pickup elements, an additional external semiconductor switch connected to one end of said additional row of pickup units, means for connecting the semiconductor switch to the external capacitor, and means for alternately energizing said first and said second external semiconductor switches.

4. A device as claimed in claim 1, wherein all of the semiconductor switches are integrated into a single integrated semiconductor body.

* * * * *